(No Model.)

J. U. GILLESPIE.

CULTIVATOR.

No. 318,178. Patented May 19, 1885.

WITNESSES
C. N. Dashiell
E. G. Biggers

J. U. Gillespie,
INVENTOR

By C. A. Snow & Co.
Attorneys (No Model.) 2 Sheets—Sheet 2.
J. U. GILLESPIE.
CULTIVATOR.
No. 318,178. Patented May 19, 1885.
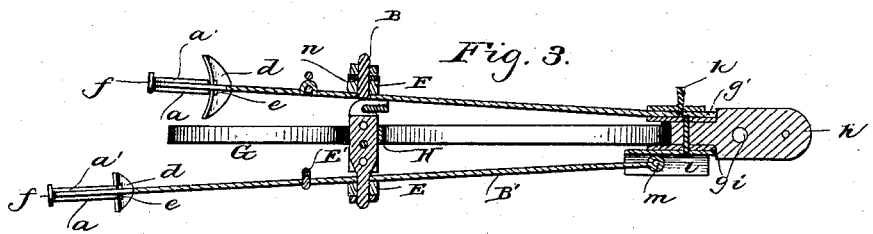
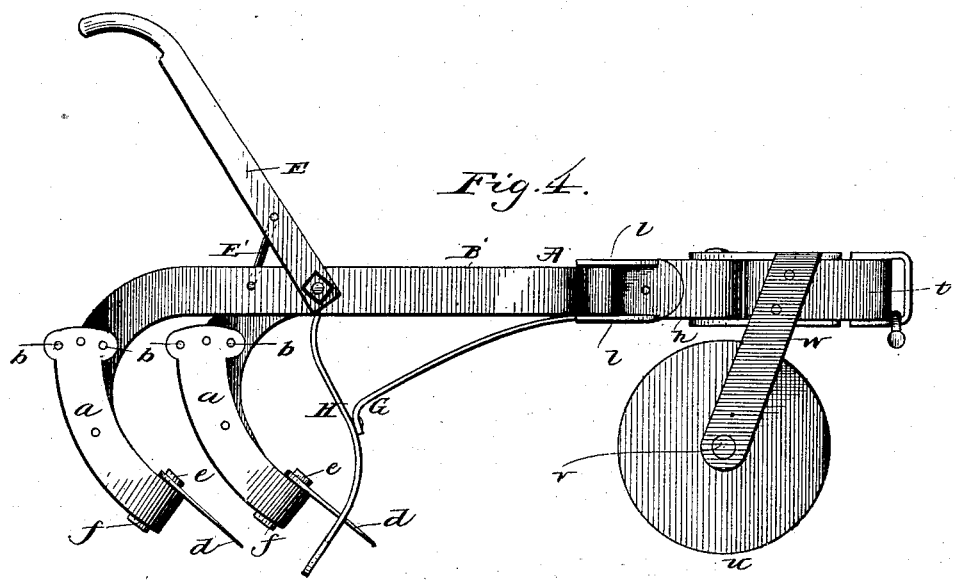
WITNESSES
C. W. Dashiell
E. G. Siggers
J. U. Gillespie
INVENTOR
By C. A. Snow & Co.
Attorneys

UNITED STATES PATENT OFFICE.

JOSEPH URIAH GILLESPIE, OF BELMONT, ALABAMA.

CULTIVATOR.

SPECIFICATION forming part of Letters Patent No. 318,178, dated May 19, 1885.

Application filed December 17, 1884. (No model.)

*To all whom it may concern:*

Be it known that I, JOSEPH U. GILLESPIE, a citizen of the United States, residing in Belmont, in the county of Sumter and State of Alabama, have invented a new and useful Improvement in Cultivators, of which the following is a specification, reference being had to the accompanying drawings.

My invention relates to cultivators, the object being to improve the details of construction, and to provide a cultivator which shall be simple in its construction, effective in its operation, and strong and durable.

With these ends in view the invention consists in the improved construction and combinations of parts, hereinafter fully described and claimed.

Figure 1:
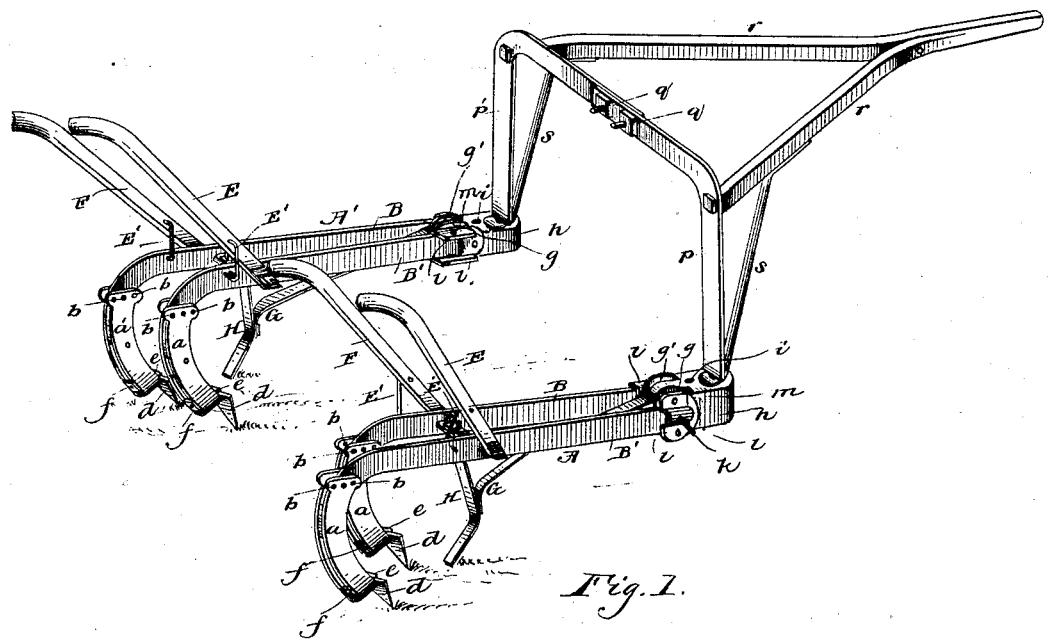
Figure 2:
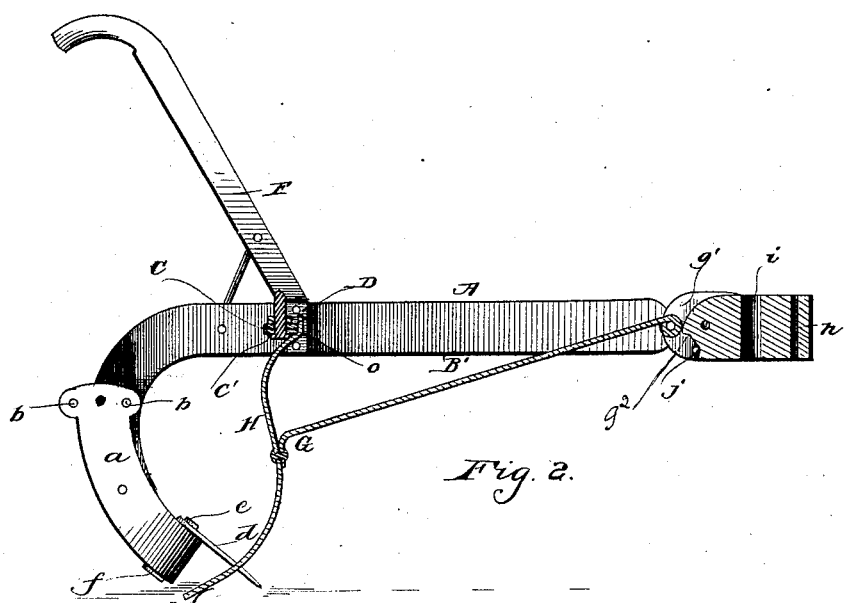

In the drawings, Figure 1 is a perspective view of two cultivators, showing the improved means for connecting the same. Fig. 2 is a longitudinal vertical section of one of the cultivators. Fig. 3 is a horizontal section, and Fig. 4 is a view, showing a single cultivator and the manner of attaching the draft appliance to the same—that is, when a single cultivator is used.

In the accompanying drawings, in which like letters of reference indicate corresponding parts in all the figures, A A' represent the cultivators, and as they are of the same construction a description of one of them will be sufficient to a clear understanding of the invention.

B B' represent the side beams, one of which is somewhat longer than the other, and extends a short distance in rear thereof. Both of said beams are curved downwardly near their rear ends. Near the lower rear ends of the beams B B' are pivoted, midway between their ends, metal plates $a$ $a'$, arranged on each side of each of said beams. The said plates are provided near their upper ends with a series of holes or openings, $b$, which are adapted when said plates are adjusted to register with openings in the lower ends of the beams. It will thus be seen that the pitch or incline of said plates may be regulated by moving them either forwardly or rearwardly until the desired adjustment has been obtained, then placing a bolt or pin through the registering openings to secure the plates against movement. The shovels or teeth $d$, of any suitable construction, are clamped upon the front of said plates by means of bolts $e$, passing between the same, said bolts being adapted to receive nuts $f$, which clamp and hold said bolts and teeth or shovels in place. It will thus be seen that by loosening said nuts the bolts carrying the teeth or shovels may be vertically adjusted between said plates and then secured in place at any desired point.

Between the beams B B', at the forward ends thereof, are arranged plates $g$ $g'$, between which is pivoted a block or strip, $h$, having a vertical hole or opening, $i$. The said block or strip $h$ is provided at its lower rear corner with an elongated notch or recess, $g^2$, in which fits a pin, $j$, mounted at its ends in the plates $g$ $g'$. By this arrangement the block or strip $h$ may be moved vertically the length of said notch or recess, thus allowing the cultivator to be raised a sufficient distance to clear the ground when being turned, and yet prevent its movement farther than a point necessary for its proper turning. The plate $g$ is provided on its outer side with a bracket, in which works the reduced end of the beam B, and adapted to clamp or bite said end is a set-screw, $k$, working in a threaded opening in the said bracket. The plate $g'$ has outwardly-extending flanges $l$, between which is pivoted the forward end of the beam B', said beam having a vertical opening or passage at said forward end, in which the pivotal bolt or pin $m$ is located.

C C' represent plates located between and connecting the beams B B', said plates having a series of holes or openings, so that they may be laterally adjusted, and secured together by a bolt and nut, as shown. The plate, C, has its outer end turned at right angles to its body portion, and said turned or bent end is journaled in a bracket, E, secured to the inner side of the beam B. The other plate, C', extends through an opening in the beam B', and is threaded at its end, and mounted upon said end and held in place thereon by a nut is a handle, E, which is braced on said beam B' by a rod, E'. The other handle, F, is mounted upon a bolt, B², extending outwardly from the outer side of the beam B, said handle F having a recessed portion, $n$, and a supplemental washer or plate formed by such recess fitting in the same, whereby when the said beam is turned inwardly or outwardly the handle may retain its position by loosening the clamping-nut. Between the plates $g\, g'$ is pivoted, at its forward end, a runner, G, having the curved bearing-face, said runner being adapted to travel between the beams. Attached to said runner is an arm, H, having a shoulder, $o$, which shoulder, when it is desired to raise the cultivator from the ground, is thrown into engagement with the plates connecting the beams B B', and thus supports the cultivator from the ground, the cultivator traveling upon the runner.

To connect the cultivators A A', I employ an appliance consisting of two inverted-L-shaped plates, $p\, p'$, having holes or openings $q$ and bolts to fit the same, and I attach to said plates beams $r$, braced upon the plates $p\, p'$ by rods $s$. The lower ends of said plates are reduced and pass through the vertical passages or openings formed in the strips between the plates $g\, g'$, and are keyed or held therein by transverse pins engaging holes or openings in the reduced ends of the plates $p\, p'$.

In using a single cultivator I employ a block, $t$, having two rearwardly-extending plates having holes or openings, which register with the openings of the block or strip $h$, and said plates are pivoted thereto. I attach a single-tree to the forward end of said block $t$, and employ a carrying-roller, $u$, journaled upon a stub-shaft, $v$, extending from the lower end of a downwardly-extending plate, $w$.

Having fully described my invention, what I claim as new, and desire to secure by Letters Patent, is—

1. The combination, with the cultivator-beams, of the draft-block pivoted between the forward ends thereof, a notch or recess in said block, and a pin to fit the same, whereby its vertical movement is limited, substantially as set forth.

2. In a cultivator, the combination of the beams, one of said beams having a vertical pivot-bearing and the other a longitudinal pivot-bearing, said beams carrying shovels, substantially as set forth.

3. In a cultivator, the combination, with the beams carrying shovels, one of said beams having a vertical pivot-bearing and the other a longitudinal pivot-bearing, of plates connecting said beams adjustably, substantially as set forth.

4. In a cultivator, the combination, with the beams carrying shovels, one of said beams being pivoted at its forward end in such manner that its shovel may be moved to or from the other beam, of a set-screw adapted to bear against the forward end of said plow-beam to hold the same rigid, substantially as set forth.

5. In a cultivator, the combination, with the horizontally-pivoted beam and the vertically-pivoted beam, of laterally-adjustable plates connecting the said beams, the plate of the horizontally-pivoted beam being pivoted thereto, substantially as set forth.

6. In a cultivator, the combination, with the horizontally-pivoted beam and the vertically-pivoted beam carrying the teeth or shovels, of a handle attached to the horizontally-pivoted beam, said handle being mounted at its lower end upon an outwardly-extending bolt of said beam, and having a recess, and a supplemental washer or plate to fit said recess, substantially as set forth.

In testimony that I claim the foregoing as my own I have hereto affixed my signature in presence of two witnesses.

JOSEPH URIAH GILLESPIE.

Witnesses:
  W. A. McCORMICK,
  J. B. TUTT.